United States Patent
Zhang et al.

(10) Patent No.: US 10,721,658 B2
(45) Date of Patent: Jul. 21, 2020

(54) MOBILITY MANAGEMENT METHOD, APPARATUS, AND SYSTEM

(71) Applicant: Huawei Technologies Co., Ltd., Shenzhen (CN)

(72) Inventors: Hongping Zhang, Shanghai (CN); Le Yan, Shanghai (CN); Mingzeng Dai, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/146,468

(22) Filed: Sep. 28, 2018

(65) Prior Publication Data
US 2019/0037456 A1 Jan. 31, 2019

Related U.S. Application Data

(63) Continuation of application No. PCT/CN2016/078325, filed on Apr. 1, 2016.

(51) Int. Cl.
| | |
|---|---|
| H04W 36/00 | (2009.01) |
| H04W 36/08 | (2009.01) |
| H04W 36/02 | (2009.01) |
| H04W 36/38 | (2009.01) |

(52) U.S. Cl.
CPC ... *H04W 36/0069* (2018.08); *H04W 36/0038* (2013.01); *H04W 36/026* (2013.01); *H04W 36/08* (2013.01); *H04W 36/38* (2013.01)

(58) Field of Classification Search
CPC ......... H04W 36/0069; H04W 36/0038; H04W 36/38; H04W 36/026; H04W 36/00; H04W 36/08; H04W 36/0005; H04W 36/18; H04W 36/34
See application file for complete search history.

(56) References Cited

U.S. PATENT DOCUMENTS

| | | | |
|---|---|---|---|
| 2011/0249651 A1* | 10/2011 | Kang | H04W 36/0033 370/331 |
| 2012/0106511 A1 | 5/2012 | Wu | |
| 2013/0165124 A1* | 6/2013 | Liang | H04W 36/0061 455/437 |

(Continued)

FOREIGN PATENT DOCUMENTS

| | | |
|---|---|---|
| CN | 102378198 A | 3/2012 |
| CN | 102378287 A | 3/2012 |

(Continued)

OTHER PUBLICATIONS

Qualcomm Incorporated, "Handover Latency Improvements", 3GPP TSG-RAN WG2 #91bis, R2-154810, Oct. 5-9, 2015, 4 pages.

*Primary Examiner* — Warner Wong
(74) *Attorney, Agent, or Firm* — Slater Matsil, LLP

(57) ABSTRACT

Embodiments relate to the field of communications technologies, and specifically, to a mobility management method, an apparatus, and a system. Embodiments of the present invention provide the mobility management method, the apparatus, and the system. When a primary cell of user equipment is changed, a change of the primary cell is performed through modification but not through conventional handover, so that data transmission is uninterrupted when the primary cell is changed.

20 Claims, 3 Drawing Sheets

(56) References Cited

U.S. PATENT DOCUMENTS

| | | | |
|---|---|---|---|
| 2013/0194981 A1* | 8/2013 | Wang | H04L 5/001 370/280 |
| 2013/0322302 A1 | 12/2013 | Gholmieh et al. | |
| 2014/0023043 A1 | 1/2014 | Yang et al. | |
| 2015/0055620 A1* | 2/2015 | Vesterinen | H04W 36/18 370/331 |
| 2015/0215825 A1* | 7/2015 | Kim | H04W 36/0088 370/331 |
| 2015/0341829 A1 | 11/2015 | Futaki et al. | |
| 2015/0373559 A1* | 12/2015 | Hong | H04W 52/0206 370/329 |
| 2016/0057660 A1* | 2/2016 | Hong | H04W 36/0016 455/436 |
| 2016/0100374 A1* | 4/2016 | Choi | H04W 56/0015 370/331 |
| 2016/0103940 A1* | 4/2016 | Kerre | G06F 30/327 716/122 |
| 2016/0112918 A1 | 4/2016 | Wen | |
| 2016/0143027 A1* | 5/2016 | Kim | H04W 72/0426 370/329 |
| 2016/0338134 A1 | 11/2016 | Nagasaka et al. | |
| 2017/0048875 A1* | 2/2017 | Martin | H04L 5/001 |
| 2017/0265172 A1 | 9/2017 | Futaki | |
| 2017/0289879 A1 | 10/2017 | Wang et al. | |
| 2017/0339580 A1* | 11/2017 | Martin | H04W 16/14 |
| 2018/0014229 A1* | 1/2018 | Chiba | H04W 36/08 |
| 2019/0104505 A1 | 4/2019 | Futaki | |
| 2019/0124565 A1* | 4/2019 | Suzuki | H04W 36/08 |
| 2019/0124566 A1* | 4/2019 | Liu | H04W 36/08 |
| 2019/0327627 A1* | 10/2019 | Martin | H04W 72/0413 |

FOREIGN PATENT DOCUMENTS

| | | |
|---|---|---|
| CN | 102469541 A | 5/2012 |
| CN | 102595529 A | 7/2012 |
| CN | 102740445 A | 10/2012 |
| CN | 104219723 A | 12/2014 |
| CN | 104301955 A | 1/2015 |
| CN | 104869599 A | 8/2015 |
| CN | 104904290 A | 9/2015 |
| EP | 2991403 A2 | 3/2016 |
| EP | 3101992 A1 | 12/2016 |
| EP | 3193525 A4 | 5/2018 |
| WO | 2013133630 A1 | 9/2013 |
| WO | 2013140533 A1 | 9/2013 |
| WO | 2015115458 A1 | 8/2015 |
| WO | 2015147578 A1 | 10/2015 |
| WO | 2016038763 A1 | 6/2017 |

* cited by examiner

MOBILITY MANAGEMENT METHOD, APPARATUS, AND SYSTEM

CROSS-REFERENCE TO RELATED APPLICATIONS

This application is a continuation of International Application No. PCT/CN2016/078325, filed on Apr. 1, 2016, the disclosure of which is hereby incorporated by reference in its entirety.

TECHNICAL FIELD

The present invention relates to the field of wireless communications technologies, and specifically, to a mobility management method, an apparatus, and a system.

BACKGROUND

In a Long Term Evolution (LTE) mobile communications system, as user equipment (UE) moves, a network hands over the UE from a source cell to a target cell by using a handover process, to perform data transmission.

After determining to perform handover, a source base station sends a handover command to the UE at an air interface, where the message is a radio resource control (RRC) connection reconfiguration message that carries a mobility control information element (mobilityControlInfo), and stops uplink and downlink data transmission performed on the UE. After receiving the handover command, the UE performs synchronization in a target cell to which the UE is handed over, and initiates a random access process to obtain a timing advance (TA) value and an uplink resource. The UE sends, on a corresponding uplink resource, an RRC connection reconfiguration completion message to a target base station, to indicate completion of the handover. After receiving the RRC connection reconfiguration completion message, the target base station recovers the uplink and downlink data transmission performed on the UE.

It can be learned from the foregoing description about the handover process that, from a time when the source base station sends the handover command to the UE to a time when the target base station receives the handover completion indication, the uplink and downlink data transmission performed on the UE is interrupted. This severely affects service experience for a delay-sensitive service, and greatly limits application of the delay-sensitive service in the LTE system, and in particular, application in a mobile scenario.

With development of a mobile communications system, service quality that can be provided by the system is becoming higher. To maintain long-term competitive edge of the 3rd Generation Partnership Project (3GPP), and further increase spectral efficiency of the system and a user throughput rate, an LTE-Advanced (LTE-A) standard is formulated. Carrier aggregation (CA) is introduced as a new technology into the LTE-A standard. The carrier aggregation means that UE may perform uplink and downlink communication by simultaneously using a plurality of cells (carriers), thereby supporting high-speed data transmission. Among the plurality of cells, one is a primary cell (PCell), and the rest is a secondary cell (SCell).

To further increase the spectral efficiency of the system and the user throughput rate, the 3GPP further introduces a dual connectivity (DC) technology into the LTE-A standard, that is, supports two base stations to simultaneously provide a data transmission service to one UE. A base station that the PCell belongs to is referred to as a master eNodeB (MeNB), and the other base station is referred to as a secondary eNodeB (SeNB). In DC, a plurality of serving cells served by the MeNB form a primary cell group (MCG), and include one PCell and one or more optional SCells. A plurality of serving cells served by the SeNB form a secondary cell group (SCG).

For a DC scenario, there are three types of data bearers: an MCG bearer, an SCG bearer, and a split bearer. When establishing a data bearer, the network designates a specific bearer type. Data of the MCG bearer can be transmitted by using only a serving cell served by the MeNB, and encrypted or decrypted in the MeNB, and uplink data is sent to a serving gateway (S-GW) using the MeNB or downlink data is received from an S-GW by using the MeNB. Data of the SCG bearer can be transmitted by using only a serving cell served by the SeNB, and encrypted or decrypted in the SeNB, and uplink data is sent to an S-GW by using the SeNB or downlink data is received from an S-GW by using the SeNB. Data of the split bearer can be transmitted by using a serving cell served by the MeNB or the SeNB, but can be encrypted or decrypted only in the MeNB, and uplink data is sent to an S-GW by using the MeNB or downlink data is received from an S-GW by using the MeNB.

When the network adds an SeNB for UE, the MeNB derives a new key based on a key of the MeNB and sends the new key to the SeNB for use, and the MeNB also sends the derived parameter to the UE. The UE derives a same key based on these derived parameters.

According to the current 3GPP protocol, for a single carrier scenario, a CA scenario, or a DC scenario, when a PCell of UE is changed, the LTE system triggers a handover process, and data transmission of the UE is interrupted in the handover process. The single carrier scenario means that the UE is in a single carrier mode, and the UE communicates with the network by using only one serving cell. The CA scenario means that the UE is configured to be in a CA mode, and the UE communicates with the network by using at least two cells served by one base station. The DC scenario means that the UE is configured to be in a DC mode, and the UE communicates with the network by using a plurality of cells served by two base stations. As network deployment density increases, a movement of UE causes the PCell to be frequently changed. Consequently, data transmission of the UE is frequently interrupted, severely affecting service experience of an end user, and in particular, service experience for a delay-sensitive service.

SUMMARY

Embodiments of the present invention provide a mobility management method, an apparatus, and a system, to resolve a problem of data transmission interruption when a primary cell PCell is changed.

Herein, it should be particularly noted that, for a single carrier scenario, UE has only one serving cell. The serving cell may be alternatively understood as a source PCell. A serving cell change is understood as a PCell change. A target serving cell is understood as a target PCell.

According to a first aspect, an embodiment of the present invention provides a mobility management method. The method includes: receiving, by user equipment (UE) from a first base station, a message used for indicating a primary cell (PCell) change, where the first base station is a base station that a source primary cell PCell of the UE belongs to, and the message used for indicating a PCell change carries information about a target PCell; performing, by the UE, a PCell change based on the received message used for indicating a PCell change, where the PCell change includes: changing the target PCell to a PCell of the UE and changing the source PCell to a secondary cell (SCell) that is in an active state and that is of the UE, and during the PCell change, the UE continues to perform data transmission with the source PCell and the target PCell; and sending, by the UE, a message used for indicating PCell change completion to the first base station or a second base station, where the second base station is a base station that the target PCell belongs to. In this embodiment of the present invention, the PCell change is performed through modification but not through handover. That the PCell change is performed through modification includes: wireless connections between the UE and the source PCell and the target PCell are kept uninterrupted during the PCell change, and the first base station and the second base station can schedule data of the UE during the PCell change.

In a possible design, the message used for indicating a PCell change is a PCell change message or a radio resource control (RRC) connection reconfiguration message that carries a PCell change indication.

In a possible design, the message used for indicating PCell change completion is a PCell change completion message or an RRC connection reconfiguration completion message.

In a possible design, the PCell change further includes: skipping resetting a medium access control (MAC) layer of a data bearer of the UE, skipping reconstructing a radio link control (RLC) layer of the data bearer of the UE, and skipping reconstructing a packet data convergence protocol (PDCP) layer of the data bearer of the UE.

In a possible design, the PCell change further includes: keeping a key and a security algorithm that are used by the UE to communicate with each serving base station unchanged during and after the PCell change, where the serving base station is a base station serving at least one cell that establishes a wireless air interface connection to the UE.

In a possible design, the PCell change further includes: when the UE determines that the source PCell and the target PCell do not belong to a same base station, that is, in a scenario of an inter-base station PCell change, the UE uses the first base station as a secondary eNodeB (SeNB), and uses the second base station as a master eNodeB (MeNB).

In a possible design, the PCell change further includes: when the UE determines that the source PCell and the target PCell belong to a same base station, that is, in a scenario of an intra-base station PCell change, skipping resetting a MAC layer of a signaling bearer of the UE, skipping reconstructing an RLC layer of the signaling bearer of the UE, and skipping reconstructing a PDCP layer of the signaling bearer of the UE.

In a possible design, the PCell change further includes: during and/or after the PCell change, communicating, by the UE, with the target PCell by continuing to use a timing advance TA value of the target PCell before the PCell change.

In a possible design, the PCell change further includes: during and/or after the PCell change, keeping an active/inactive state of another serving cell other than the source PCell and the target PCell unchanged.

In a possible design, the PCell change further includes: when the UE determines that the target PCell is not a current serving cell of the UE, the UE first adds the target PCell as the secondary cell (SCell) of the UE; and then the UE performs the PCell change. The PCell change includes: changing the target PCell to the PCell of the UE and changing the source PCell to the secondary cell SCell that is in the active state and that is of the UE.

According to a second aspect, an embodiment of the present invention provides another mobility management method. The method includes: determining, by a first base station, to perform a primary cell PCell change for user equipment, and determining a target PCell, where the first base station is a base station that a source PCell of the UE belongs to; and sending, by the first base station, a message used for indicating a PCell change to the UE, where the message used for indicating a PCell change carries information about a target PCell, and the PCell change includes: changing the target PCell to a PCell of the UE and changing the source PCell to a secondary cell SCell that is in an active state and that is of the UE. During the PCell change, the UE continues to perform data transmission with the serving cell. In this embodiment of the present invention, the PCell change is performed through modification but not through handover. That the PCell change is performed through modification includes: wireless connections between the UE and the source PCell and the target PCell are kept uninterrupted during the PCell change, and the first base station and the second base station can schedule data of the UE during the PCell change.

In a possible design, the message used for indicating a PCell change is a PCell change message or an RRC connection reconfiguration message that carries a PCell change indication.

In a possible design, the PCell change further includes: keeping a key and a security algorithm that are used by the first base station unchanged during and after the PCell change.

In a possible design, the PCell change further includes: receiving, by the first base station from the UE, a message used for indicating PCell change completion.

In a possible design, the message used for indicating PCell change completion is a PCell change completion message or an RRC connection reconfiguration completion message.

In a possible design, the PCell change further includes: sending, by the first base station, a request message used for indicating a PCell change to a second base station, where the second base station is a base station that the target PCell of the UE belongs to, and the request message used for indicating a PCell change carries information about the target PCell; receiving, by the first base station, an acknowledgement message sent by the second base station, where the acknowledgement message is used for acknowledging the request message that is used for indicating a PCell change and that is sent by the first base station to the second base station; receiving, by the first base station, a message that is used for indicating PCell change completion or a message that is used for requesting a sequence number (SN) state and that is sent by the second base station, where the message used for requesting an SN state is used for requesting an uplink packet data convergence protocol PDCP SN receiving state and a downlink PDCP SN sending state from the first base station, and the message used for indicating PCell change completion or the message used for requesting an SN state is sent by the second base station after the second base station receives the message used for indicating PCell change completion from the UE; and sending, by the first base station, an SN state transition message to the second base station, where the SN state transition message carries the uplink PDCP SN receiving state and the downlink PDCP SN sending state, and the SN state transition message is sent by the first base station after the first base station receives the message used for indicating PCell change completion or the message used for requesting an SN state.

In a possible design, the request message used for indicating a PCell change is a PCell change request message or a handover request message that carries a PCell change indication.

According to a third aspect, an embodiment of the present invention provides another mobility management method. The method includes: receiving, by a second base station, a request message that is used for indicating a primary cell PCell change and that is sent by a first base station, where the first base station is a base station that a source PCell of UE belongs to, the second base station is a base station that a target PCell of the UE belongs to, the request message used for indicating a PCell change carries information about the target PCell, and the PCell change includes: changing the target PCell to a PCell of the UE and changing the source PCell to a secondary cell SCell that is in an active state and that is of the UE, where during the PCell change, the second base station continues to perform data transmission with the UE; sending, by the second base station, an acknowledgement message to the first base station, where the acknowledgement message is used for acknowledging the request message that is used for indicating a PCell change and that is sent by the first base station to the second base station. In this embodiment of the present invention, the PCell change is performed through modification but not through handover. That the PCell change is performed through modification includes: wireless connections between the UE and the source PCell and the target PCell are kept uninterrupted during the PCell change, and the first base station and the second base station can schedule data of the UE during the PCell change.

In a possible design, the mobility management method further includes: receiving, by the second base station, a message that is used for indicating PCell change completion and that is sent by the UE; sending, by the second base station, the message used for indicating PCell change completion or a message used for requesting a sequence number SN state to the first base station, where the message used for requesting an SN state is used for requesting an uplink packet data convergence protocol PDCP SN receiving state and a downlink PDCP SN sending state from the first base station, and the message used for indicating PCell change completion or the message used for requesting an SN state is sent by the second base station after the second base station receives the message used for indicating PCell change completion from the UE; and receiving, by the second base station, an SN state transition message from the first base station, where the SN state transition message carries the uplink PDCP SN receiving state and the downlink PDCP SN sending state.

In a possible design, the request message used for indicating a PCell change is a PCell change request message or a handover request message that carries a PCell change indication.

In a possible design, the PCell change further includes: keeping a key and a security algorithm that are used by the second base station unchanged during and after the PCell change.

In a possible design, the acknowledgement message is sent by the second base station to the first base station and is used for acknowledging the request message that is used for indicating a PCell change and that is sent by the first base station to the second base station, and the acknowledgement message carries tunnel information of a split bearer, to transmit an uplink data packet decrypted and sent by the first base station to the second base station after S1 path switching, and the uplink data packet is forwarded by the second base station to a serving gateway (S-GW).

According to a fourth aspect, an embodiment of the present invention provides user equipment. The user equipment includes: a transceiver, configured to receive, from a first base station, a message used for indicating a PCell change, where the first base station is a base station that a source primary cell PCell of the UE belongs to, and the message used for indicating a PCell change carries information about a target PCell; and a processor, configured to perform a PCell change based on the received message used for indicating a PCell change, where the PCell change includes: changing the target PCell to a PCell of the UE and changing the source PCell to a secondary cell SCell that is in an active state and that is of the UE, and during the PCell change, the UE continues to perform data transmission with the serving cell; and the transceiver is further configured to send a message used for indicating PCell change completion to the first base station or a second base station, where the second base station is a base station that the target PCell belongs to. In this embodiment of the present invention, the PCell change is performed through modification but not through handover. That the PCell change is performed through modification includes: wireless connections between the UE and the source PCell and the target PCell are kept uninterrupted during the PCell change, and the first base station and the second base station can schedule data of the UE during the PCell change.

In a possible design, the message that is used for indicating a PCell change and that is received by the transceiver is a PCell change message or an RRC connection reconfiguration message that carries a PCell change indication.

In a possible design, the message that is used for indicating PCell change completion and that is sent by the transceiver is a PCell change completion message or an RRC connection reconfiguration completion message.

In a possible design, the processor is further configured to: skip resetting a MAC layer of a data bearer of the UE, skip reconstructing an RLC layer of the data bearer of the UE, and skip reconstructing a PDCP layer of the data bearer of the UE. Then, continuous data scheduling and transmission during the PCell change can be implemented, transmission interruptions can be reduced or even prevented, and a data packet loss, data packet retransmission, or the like caused by resetting or reconstruction can be prevented, so that service experience for a delay-sensitive service during the PCell change can be effectively improved.

In a possible design, the processor is further configured to keep a key and a security algorithm that are used to communicate with each serving base station unchanged during and after the PCell change, where the serving base station herein is a base station serving at least one cell that establishes a wireless air interface connection to the UE.

In a possible design, the processor is further configured to: when the processor determines that the source PCell and the target PCell do not belong to a same base station, use the first base station as a secondary eNodeB SeNB, and use the second base station as a master eNodeB MeNB.

In a possible design, the processor is further configured to: when the processor determines that the source PCell and the target PCell belong to a same base station, skip resetting a MAC layer of a signaling bearer of the UE, skip reconstructing an RLC layer of the signaling bearer of the UE, and skip reconstructing a PDCP layer of the signaling bearer of the UE.

In a possible design, the transceiver is further configured to: during and/or after the PCell change, communicate with the target PCell by continuing to use a timing advance TA value of the target PCell before the PCell change.

In a possible design, the processor is further configured to: during and/or after the PCell change, keep an active/inactive state of another serving cell other than the source PCell and the target PCell unchanged.

In a possible design, the processor is further configured to: when the processor determines that the target PCell is not a serving cell of the UE, first add the target PCell as the SCell of the UE; and then perform the PCell change, to change the target PCell to the PCell of the UE and change the source PCell to the secondary cell SCell that is in the active state and that is of the UE.

According to a fifth aspect, an embodiment of the present invention provides a first base station device. The first base station is a base station that a source PCell of UE belongs to. The first base station includes: a processor, configured to: determine to perform a PCell change for the UE, and determine a target PCell; and a transceiver, configured to send a message used for indicating a PCell change to the UE, where the message used for indicating a PCell change carries information about the target PCell, and the PCell change includes: changing the target PCell to a PCell of the UE and changing the source PCell to a secondary cell SCell that is in an active state and that is of the UE. In this embodiment of the present invention, the PCell change is performed through modification but not through handover. That the PCell change is performed through modification includes: wireless connections between the UE and the source PCell and the target PCell are kept uninterrupted during the PCell change, and the first base station and the second base station can schedule data of the UE during the PCell change.

In a possible design, the message that is used for indicating a PCell change and that is sent by the transceiver is a PCell change message or an RRC connection reconfiguration message that carries a PCell change indication.

In a possible design, the processor is further configured to: decrypt uplink data from the UE, encrypt downlink data sent to the UE, and keep a key and a security algorithm that are used by the processor unchanged during and after the PCell change.

In a possible design, the transceiver is further configured to receive, from the UE, a message used for indicating PCell change completion.

In a possible design, the message that is used for indicating PCell change completion and that is received by the transceiver is a PCell change completion message or an RRC connection reconfiguration completion message.

In a possible design, the transceiver is further configured to: send a request message used for indicating a PCell change to a second base station, where the second base station is a base station that the target PCell of the UE belongs to, and the request message used for indicating a PCell change carries information about the target PCell; receive an acknowledgement message sent by the second base station, where the acknowledgement message is used for acknowledging the request message that is used for indicating a PCell change and that is sent by the transceiver to the second base station; receive a message that is used for indicating PCell change completion or a message that is used for requesting an SN state and that is sent by the second base station, where the message used for requesting an SN state is used for requesting an uplink PDCP SN receiving state and a downlink PDCP SN sending state from the first base station; and send an SN state transition message to the second base station, where the SN state transition message carries the uplink PDCP SN receiving state and the downlink PDCP SN sending state, and the SN state transition message is sent by the transceiver after the transceiver receives, from the second base station, the message used for indicating PCell change completion or the message used for requesting an SN state.

In a possible design, the request message that is used for indicating a PCell change and that is sent by the transceiver is a PCell change request message or a handover request message that carries a PCell change indication.

According to a sixth aspect, an embodiment of the present invention provides a second base station device. The second base station is a base station that a target PCell of user equipment belongs to. The second base station includes: a transceiver, configured to receive a request message that is used for indicating a primary cell PCell change and that is sent by a first base station, where the first base station is a base station that a source PCell of the UE belongs to, the request message used for indicating a PCell change carries information about the target PCell, and the PCell change includes: changing the target PCell to a PCell of the UE and changing the source PCell to a secondary cell SCell that is in an active state and that is of the UE; during the PCell change, the transceiver continues to perform data transmission with the UE; and the transceiver is further configured to send an acknowledgement message to the first base station, where the acknowledgement message is used for acknowledging the request message that is used for indicating a PCell change and that is sent by the first base station to the second base station. In this embodiment of the present invention, the PCell change is performed through modification but not through handover. That the PCell change is performed through modification includes: wireless connections between the UE and the source PCell and the target PCell are kept uninterrupted during the PCell change, and the first base station and the second base station can schedule data of the UE during the PCell change.

In a possible design, the transceiver is further configured to: receive a message that is used for indicating PCell change completion and that is sent by the UE; send the message used for indicating PCell change completion or a message used for requesting a sequence number SN state to the first base station, where the message used for requesting an SN state is used for requesting an uplink packet data convergence protocol PDCP SN receiving state and a downlink PDCP SN sending state from the first base station, and the message used for indicating PCell change completion or the message used for requesting an SN state is sent by the transceiver after the transceiver receives the message used for indicating PCell change completion from the UE; and receive an SN state transition message from the first base station, where the message carries the uplink PDCP SN receiving state and the downlink PDCP SN sending state.

In a possible design, the request message that is used for indicating a PCell change and that is received by the transceiver is a PCell change request message or a handover request message that carries a PCell change indication.

In a possible design, the second base station further includes: a processor, configured to: decrypt uplink data from the UE, encrypt downlink data sent to the UE, and keep a key and a security algorithm that are used by the processor unchanged during and after the PCell change.

In a possible design, the acknowledgement message sent by the transceiver carries tunnel information of a split bearer, to transmit an uplink data packet decrypted and sent by the first base station to the second base station after S1 path switching, and the uplink data packet is forwarded by the transceiver to an S-GW.

According to a seventh aspect, an embodiment of the present invention provides another user equipment device. The device includes: a transceiver unit, configured to receive, from a first base station, a message used for indicating a PCell change, where the first base station is a base station that a source primary cell PCell of the UE belongs to, and the message used for indicating a PCell change carries information about a target PCell; and a processing unit, configured to perform a PCell change based on the received message used for indicating a PCell change, where the PCell change includes: changing the target PCell to a PCell of the UE and changing the source PCell to a secondary cell SCell that is in an active state and that is of the UE, and during the PCell change, the UE continues to perform data transmission with the serving cell; and the transceiver unit is further configured to send a message used for indicating PCell change completion to the first base station or a second base station, where the second base station is a base station that the target PCell belongs to. In this embodiment of the present invention, the PCell change is performed through modification but not through handover. That the PCell change is performed through modification includes: wireless connections between the UE and the source PCell and the target PCell are kept uninterrupted during the PCell change, and the first base station and the second base station can schedule data of the UE during the PCell change.

In a possible design, the message that is used for indicating a PCell change and that is received by the transceiver unit is a PCell change message or an RRC connection reconfiguration message that carries a PCell change indication.

In a possible design, the message that is used for indicating PCell change completion and that is sent by the transceiver unit is a PCell change completion message or an RRC connection reconfiguration completion message.

In a possible design, the processing unit is further configured to: skip resetting a MAC layer of a data bearer of the UE, skip reconstructing an RLC layer of the data bearer of the UE, and skip reconstructing a PDCP layer of the data bearer of the UE. Then, continuous data scheduling and transmission during the PCell change can be implemented, transmission interruptions can be reduced or even prevented, and a data packet loss, data packet retransmission, or the like caused by resetting or reconstruction can be prevented, so that service experience for a delay-sensitive service during the PCell change can be effectively improved.

In a possible design, the processing unit is further configured to keep a key and a security algorithm that are used to communicate with each serving base station unchanged during and after the PCell change, where the serving base station herein is a base station serving at least one cell that establishes a wireless air interface connection to the UE.

In a possible design, the processing unit is further configured to: when the processing unit determines that the source PCell and the target PCell do not belong to a same base station, use the first base station as a secondary eNodeB SeNB, and use the second base station as a master eNodeB MeNB.

In a possible design, the processing unit is further configured to: when the processing unit determines that the source PCell and the target PCell belong to a same base station, skip resetting a MAC layer of a signaling bearer of the UE, skip reconstructing an RLC layer of the signaling bearer of the UE, and skip reconstructing a PDCP layer of the signaling bearer of the UE.

In a possible design, the transceiver unit is further configured to: during and/or after the PCell change, communicate with the target PCell by continuing to use a timing advance TA value of the target PCell before the PCell change.

In a possible design, the processing unit is further configured to: during and/or after the PCell change, keep an active/inactive state of another serving cell other than the source PCell and the target PCell unchanged.

In a possible design, the processing unit is further configured to: when the processing unit determines that the target PCell is not a serving cell of the UE, first add the target PCell as the SCell of the UE; and then perform the PCell change, to change the target PCell to the PCell of the UE and change the source PCell to the secondary cell SCell that is in the active state and that is of the UE.

According to an eighth aspect, an embodiment of the present invention provides another first base station device. The first base station device is a base station that a source PCell of UE belongs to. The first base station device includes: a processing unit, configured to: determine to perform a PCell change for the UE, and determine a target PCell; and a transceiver unit, configured to send a message used for indicating a PCell change to the UE, where the message used for indicating a PCell change carries information about a target PCell, and the PCell change includes: changing the target PCell to a PCell of the UE and changing the source PCell to a secondary cell SCell that is in an active state and that is of the UE. In this embodiment of the present invention, the PCell change is performed through modification but not through handover. That the PCell change is performed through modification includes: wireless connections between the UE and the source PCell and the target PCell are kept uninterrupted during the PCell change, and the first base station and the second base station can schedule data of the UE during the PCell change.

In a possible design, the message that is used for indicating a PCell change and that is sent by the transceiver unit is a PCell change message or an RRC connection reconfiguration message that carries a PCell change indication.

In a possible design, the processing unit is further configured to: decrypt uplink data from the UE, encrypt downlink data sent to the UE, and keep a key and a security algorithm that are used by the processing unit unchanged during and after the PCell change.

In a possible design, the transceiver unit is further configured to receive, from the UE, a message used for indicating PCell change completion.

In a possible design, the message that is used for indicating PCell change completion and that is received by the transceiver unit is a PCell change completion message or an RRC connection reconfiguration completion message.

In a possible design, the transceiver unit is further configured to: send a request message used for indicating a PCell change to a second base station, where the second base station is a base station that the target PCell of the UE belongs to, and the request message used for indicating a PCell change carries information about the target PCell; receive an acknowledgement message sent by the second base station, where the acknowledgement message is used for acknowledging the request message that is used for indicating a PCell change and that is sent by the transceiver unit to the second base station; receive a message that is used for indicating PCell change completion or a message that is used for requesting an SN state and that is sent by the second base station, where the message used for requesting an SN state is used for requesting an uplink PDCP SN receiving state and a downlink PDCP SN sending state from the first base station; and send an SN state transition message to the second base station, where the SN state transition message carries the uplink PDCP SN receiving state and the downlink PDCP SN sending state, and the SN state transition message is sent by the transceiver unit after the transceiver unit receives, from the second base station, the message used for indicating PCell change completion or the message used for requesting an SN state.

In a possible design, the request message that is used for indicating a PCell change and that is sent by the transceiver unit is a PCell change request message or a handover request message that carries a PCell change indication.

According to a ninth aspect, an embodiment of the present invention provides another second base station device. The second base station is a base station that a target PCell of user equipment belongs to. The second base station includes: a transceiver unit, configured to receive a request message that is used for indicating a primary cell PCell change and that is sent by a first base station, where the first base station is a base station that a source PCell of the UE belongs to, the request message used for indicating a PCell change carries information about the target PCell, and the PCell change includes: changing the target PCell to a PCell of the UE and changing the source PCell to a secondary cell SCell that is in an active state and that is of the UE; during the PCell change, the transceiver unit continues to perform data transmission with the UE; and the transceiver unit is further configured to send an acknowledgement message to the first base station, where the acknowledgement message is used for acknowledging the request message that is used for indicating a PCell change and that is sent by the first base station to the second base station. In this embodiment of the present invention, the PCell change is performed through modification but not through handover. That the PCell change is performed through modification includes: wireless connections between the UE and the source PCell and the target PCell are kept uninterrupted during the PCell change, and the first base station and the second base station can schedule data of the UE during the PCell change.

In a possible design, the transceiver unit is further configured to: receive a message that is used for indicating PCell change completion and that is sent by the UE; send the message used for indicating PCell change completion or a message used for requesting a sequence number SN state to the first base station, where the message used for requesting an SN state is used for requesting an uplink packet data convergence protocol PDCP SN receiving state and a downlink PDCP SN sending state from the first base station, and the message used for indicating PCell change completion or the message used for requesting an SN state is sent by the transceiver unit after the transceiver unit receives the message used for indicating PCell change completion from the UE; and receive an SN state transition message from the first base station, where the message carries the uplink PDCP SN receiving state and the downlink PDCP SN sending state.

In a possible design, the request message that is used for indicating a PCell change and that is received by the transceiver unit is a PCell change request message or a handover request message that carries a PCell change indication.

In a possible design, the second base station further includes: a processing unit, configured to: decrypt uplink data from the UE, encrypt downlink data sent to the UE, and keep a key and a security algorithm that are used by the processing unit unchanged during and after the PCell change.

In a possible design, the acknowledgement message sent by the transceiver unit carries tunnel information of a split bearer, to transmit an uplink data packet decrypted and sent by the first base station to the second base station after S1 path switching, and the uplink data packet is forwarded by the transceiver unit to an S-GW.

According to a tenth aspect, an embodiment of the present invention provides a communications system. The system includes the UE provided in the embodiment of the fourth aspect or the seventh aspect and the first base station device provided in the embodiment of the fifth aspect or the eighth aspect; or the UE provided in the embodiment of the fourth aspect or the seventh aspect, the first base station device provided in the embodiment of the fifth aspect or the eighth aspect, and the second base station device provided in the embodiment of the sixth aspect or the ninth aspect; or the first base station device provided in the embodiment of the fifth aspect or the eighth aspect, and the second base station device provided in the embodiment of the sixth aspect or the ninth aspect.

According to the embodiments of the present invention, the PCell change is performed through modification, so that data transmission is uninterrupted when the PCell of the UE is changed, thereby effectively improving the service experience for the delay-sensitive service, and in particular, service experience in a mobile scenario.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
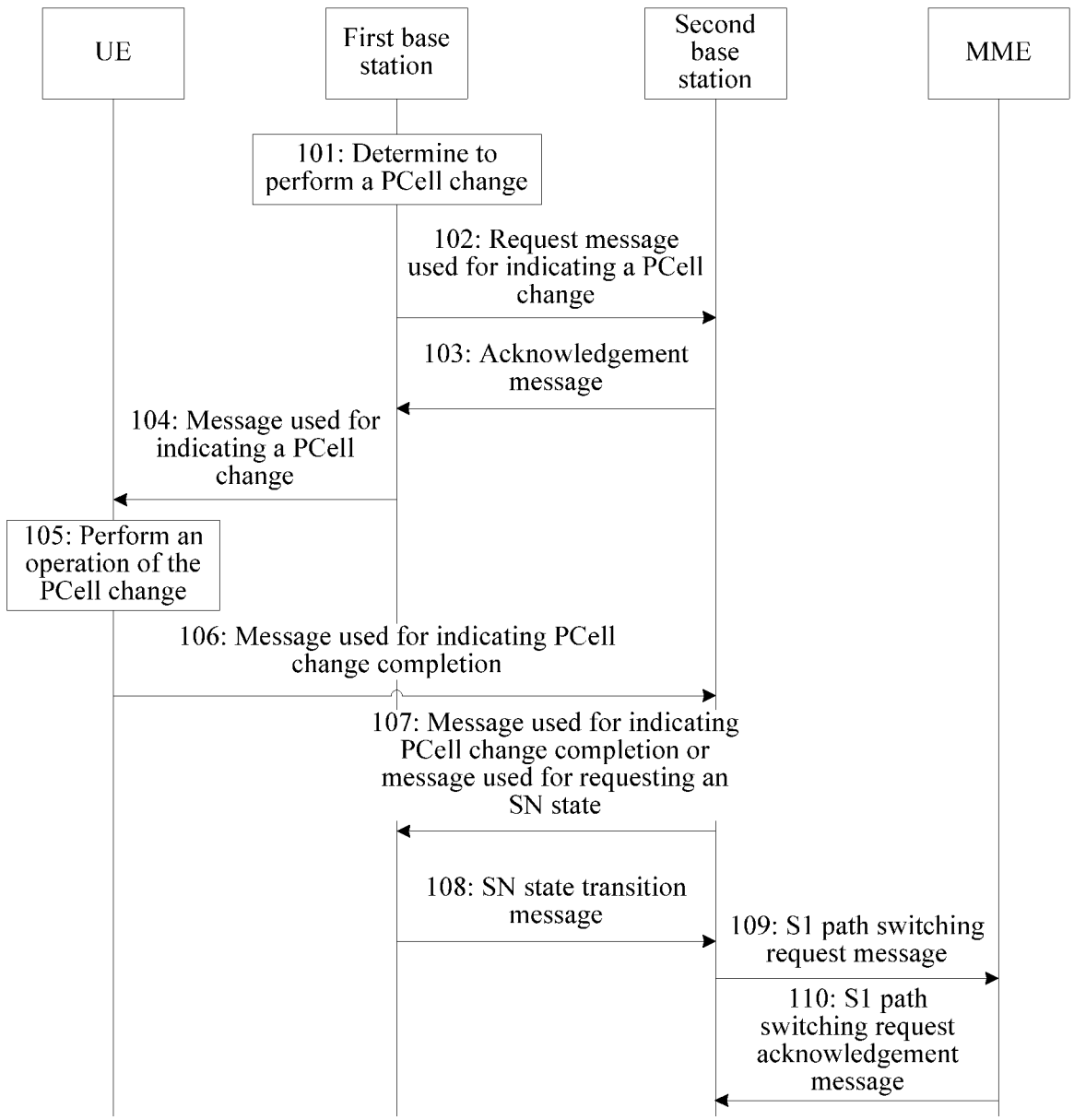
FIG. 1 is a schematic flowchart of a possible inter-base station PCell change according to an embodiment of the present invention.

To make the objectives, technical solutions, and advantages of the present invention clearer, the following further describes the embodiments of the present invention in detail with reference to the accompanying drawings. All other embodiments obtained by a person of ordinary skill in the art without creative efforts shall fall within the protection scope of the present invention.

As shown in FIG. 1, FIG. 1 provides a schematic flowchart of a possible inter-base station primary cell (PCell) change according to an embodiment of the present invention.

101: A first base station determines to perform a PCell change for user equipment (UE), and determines a target PCell of the PCell change. The first base station is a base station that a source PCell belongs to, and the source PCell is a PCell that provides a service to the UE before the PCell change. In this embodiment, the first base station may be also referred to as a source master eNodeB (MeNB).

Further, the first base station may determine, based on radio resource management (RRM) related information such as a measurement report reported by the UE, whether to perform the PCell change and which cell is selected as the target PCell.

102: The first base station sends a request message used for indicating a PCell change to a second base station, where the second base station is a base station that the target PCell belongs to, and in this embodiment, the second base station may also be referred to as a target MeNB. The request message used for indicating a PCell change carries information about the target PCell, for example, a cell identifier or an index of the target PCell.

Optionally, the request message used for indicating a PCell change may not carry information about a key. When the target PCell is a serving cell of the UE or the second base station is a serving base station of the UE, a key and a security algorithm may be kept unchanged for the second base station during and after the PCell change, so that impact on data transmission may be reduced because a change of the key or the security algorithm may cause an interruption of the data transmission.

The request message used for indicating a PCell change may be a PCell change request message or a handover request message that carries a PCell change indication, and indicates that the PCell change is performed through modification. That the PCell change is performed through modification includes: wireless connections between the UE and the source PCell and the target PCell are kept uninterrupted during the PCell change, and the first base station and the second base station can schedule data of the UE during the PCell change. It may be understood that, the request message used for indicating a PCell change may alternatively be a message of another type. This is not limited in the present invention. For a new message type, a specific message structure of the new message type may be set with reference to the handover request message.

Optionally, the request message used for indicating a PCell change may further carry context information of the UE, including radio resource control (RRC) configuration information and carrier information.

Optionally, the request message used for indicating a PCell change may further carry first GPRS Tunneling Protocol (GTP) tunnel information of a split bearer, to transmit a downlink data packet that is encrypted and sent by the second base station to the first base station after S1 path switching. The downlink data packet needs to be sent by the first base station to the UE by using an air interface.

103: The second base station sends an acknowledgement message to the first base station, to acknowledge the request message that is used for indicating a PCell change and that is sent by the first base station to the second base station.

Optionally, the acknowledgement message may carry second GTP tunnel information of the split bearer, to transmit an uplink data packet that is decrypted and sent by the first base station to the second base station after the S1 path switching. The uplink data packet is forwarded by the second base station to a serving gateway (S-GW).

Optionally, the acknowledgement message may carry third GTP tunnel information of the split bearer, to transmit an uplink data packet that is sent by the first base station to the second base station after the S1 path switching. The uplink data packet is decrypted and sent by the second base station to the S-GW.

Optionally, the acknowledgement message may carry a configuration parameter that is based on an original UE context. For example, if a physical uplink control channel (PUCCH) is not previously configured for the target PCell, the second base station adds a PUCCH configuration used for the target PCell to the acknowledgement message, or the target PCell uses a PUCCH configuration of the source PCell. There are two implementations in which the acknowledgement message carries these configuration parameters. One is that the acknowledgement message carries an information element corresponding to the configuration parameters. The other is that the acknowledgement message carries a container information element, the container cell includes an RRC message, and the RRC message carries these configuration parameters. The RRC message is sent by the first base station to the UE. The RRC message is used for requesting the UE to change the PCell to a target PCell served by the second base station. A process of the change is performed through modification but not through handover.

104: The first base station sends a message used for indicating a PCell change to the UE, where the message used for indicating a PCell change carries information about a target PCell, for example, a cell identifier or an index of the target PCell.

The message used for indicating a PCell change may be a PCell change message or an RRC connection reconfiguration message that carries a PCell change indication, to indicate that the UE performs the PCell change through modification but not through handover. Specifically, that the PCell change is performed through modification includes: wireless connections between the UE and the source PCell and the target PCell are kept uninterrupted during the PCell change, and the first base station and the second base station can schedule data of the UE during the PCell change. It may be understood that, the message used for indicating a PCell change may alternatively be a message of another type. This is not limited in the present invention.

The message used for indicating a PCell change may be produced by the first base station, or may be the RRC message included in the container carried in the received acknowledgement message that is sent by the second base station in step 103.

Optionally, the key and the security algorithm that are used by the first base station may be kept unchanged during and after the PCell change, thereby reducing impact on the data transmission during the PCell change.

105: The UE performs the PCell change based on the message that is used for indicating a PCell change and that is received from the first base station. The PCell change includes: changing the target PCell to the PCell of the UE and changing the source PCell to the secondary cell SCell that is in the active state and that is of the UE.

Optionally, after receiving the message used for indicating a PCell change, the UE determines whether the target PCell is the serving cell of the UE. If the target PCell is the serving cell of the UE, the UE performs a process of the PCell change, and during the PCell change, the UE may continue to perform data transmission with the first base station or with the first base station and the second base station. Before the PCell change, the target PCell is already the serving cell of the UE, and the UE maintains an available TA value of the target PCell. During the PCell change or after the PCell change, the UE may continue to use a current TA value of the target PCell, and does not need to initiate a random access process in the target PCell, so that the process of the PCell change can be more quickly completed. If the target PCell is not the serving cell of the UE, the UE first adds the target PCell as a secondary cell SCell of the UE, and then performs the process of the PCell change. In a process of adding the target PCell as the SCell of the UE and during the PCell change, the UE may continue to perform data transmission with the first base station or with the first base station and the second base station. It may be understood that, in a process of adding the target PCell as the SCell of the UE, if the target PCell is a first serving cell of the second base station, the random access process may be initiated to obtain a timing advance (TA) value; and if the second base station is already the serving base station of the UE before the PCell change, the UE maintains an available TA value of another serving cell served by the second base station, and the UE may use the TA value as a TA value of the target PCell and does not need to initiate the random access process in the target PCell, so that the process of the PCell change can be more quickly completed.

It may be understood that, after the PCell change, the source PCell and the target PCell are both serving cells of the UE, and respectively belong to the first base station and the second base station. The source PCell and the target PCell serve the UE in a DC manner, and therefore it is equivalent to that DC is configured for the UE.

In the prior art, when the PCell of the UE is changed, the PCell of the UE is handed over from the source PCell to the target PCell through handover, data transmission between the UE and a network side is interrupted in a handover process. However, according to the PCell change method provided in this embodiment of the present invention, the PCell of the UE is changed from the source PCell to the target PCell through modification. Specifically, that the PCell change is performed through modification includes: wireless connections between the UE and the source PCell and the target PCell are kept uninterrupted during the PCell change, and the first base station and the second base station can schedule data of the UE during the PCell change.

Specifically, the PCell change further includes: using, by the UE, the first base station as a secondary eNodeB (SeNB), and using the second base station as a master eNodeB (MeNB). Corresponding bearers may also be correspondingly changed, and specifically include a primary cell group (MCG) bearer, a secondary cell group (SCG) bearer, and a split bearer. Specifically, there are the following two different bearer change solutions.

One bearer change solution is that a data flow of an original bearer is maintained as much as possible, so that data transmission is affected as little as possible during the PCell change. Specifically, a bearer type associated with the first base station is changed from the MCG bearer to the SCG bearer, and a bearer type associated with the second base station is changed from the SCG bearer to the MCG bearer. For the split bearer, a security function of the split bearer is always anchored to a current MeNB. There is only one current MeNB. The current MeNB is the first base station before PCell change completion. The current MeNB is the second base station after the PCell change completion. After the PCell change completion, a data packet on the split bearer is encrypted and decrypted by using the security key and the security algorithm of the second base station. A data packet before the PCell change completion is still encrypted and decrypted by using the key and the security algorithm in the first base station. Optionally, a data packet already cached or sent at an RLC layer and a lower layer of the first base station is still sent in the first base station, until the sending is completed.

The other bearer change solution is that a bearer is transferred to the second base station as much as possible. Specifically, an MCG bearer associated with the first base station before the PCell change is associated with the second base station after the PCell change. If the second base station is already a serving base station of the UE before the PCell change, an SCG bearer associated with the second base station before the PCell change is still associated with the second base station after the PCell change, and a bearer type is changed to the MCG bearer. The split bearer before the PCell change is still the split bearer after the PCell change, but the security function is anchored to the second base station. Alternatively, the split bearer before the PCell change is changed to the MCG bearer associated with the second base station after the PCell change. Optionally, during the PCell change, for those bearers whose associated base stations are different before and after the PCell change, such as the MCG bearer and the split bearer before the PCell change, a data packet already cached or sent at an RLC layer and a lower layer of the first base station is still sent in the first base station, until the sending is completed.

Optionally, the PCell change includes: skipping resetting a medium access control (MAC) layer of a data bearer of the UE, skipping reconstructing a radio link control (RLC) layer of the data bearer of the UE, and skipping reconstructing a packet data convergence protocol (PDCP) layer of the data bearer of the UE. Then, continuous data scheduling and transmission during the PCell change can be implemented, transmission interruptions can be reduced or even prevented, and a data packet loss, data packet retransmission, or the like caused by resetting or reconstruction can be prevented, so that service experience for a delay-sensitive service during the PCell change can be effectively improved.

It may be understood that, a signaling bearer is sent by a cell served by the current MeNB, when the MeNB is changed, the UE resets a MAC layer of the signaling bearer and reconstructs the RLC layer and the PDCP layer, and a security key and a security algorithm of the signaling bearer are changed from the security key and the security algorithm of the source MeNB to a security key and a security algorithm of the target MeNB.

Optionally, the PCell change further includes: a key and a security algorithm that are used by the UE to communicate with each serving base station may be kept unchanged during and after the PCell change, where the serving base station is a base station serving at least one cell that establishes a wireless air interface connection to the UE, and the serving base station includes at least the first base station. If the target PCell is the serving cell of the UE, the second base station is also the serving base station of the UE. If the target PCell is not the serving cell of the UE but another cell served by the second base station is already the serving cell of the UE, the second base station is also the serving base station of the UE. If the target PCell is not the serving cell of the UE and no other cell served by the second base station is the serving cell of the UE, the second base station becomes the serving base station of the UE only after the target PCell is added as the SCell of the UE. In this embodiment, the UE may further simultaneously communicate with another base station other than the first base station and the second base station.

Optionally, the PCell change further includes: during and/or after the PCell change, keeping an active/inactive state of another serving cell other than the source PCell and the target PCell unchanged. To be specific, if a serving cell is in an active state before the change, the serving cell remains in the active state during the change and/or after the change; if a serving cell is in an inactive state before the change, the serving cell remains in the inactive state during the change and/or after the change. In this way, continuous data transmission between the UE and the another serving cell during the PCell change is implemented.

It may be understood that, the PCell change includes: after the PCell change completion, changing the source PCell to an SCell in the active state, and changing the target PCell to a PCell in the active state.

It may be understood that, the PCell change further includes: changing a frequency associated with a measurement identifier from a frequency of the source PCell before the PCell change to a frequency of the target PCell after the PCell change.

Optionally, the PCell change further includes: applying a new PUCCH configuration to the target PCell of the UE, where the PUCCH configuration is carried in the message used for indicating a PCell change to the UE.

A possible implementation corresponding to the foregoing changing the target PCell to a PCell of the UE and changing the source PCell to a secondary cell SCell that is in the active state and that is of the UE is as follows.

To which cell the PCell of the UE specifically corresponds is identified by using an attribute parameter PCELL_ID of the UE. During the PCell change, a value of the attribute parameter PCELL_ID is changed from a cell identifier of the source PCell, such as 10, to a cell identifier of the target PCell, such as 20. Whether UE and a cell connected to the UE correspond to an SCell or a PCell of the UE is identified by using an attribute parameter CELL_TYPE of the cell. When a cell is the PCell of the UE, a value of the corresponding attribute parameter CELL_TYPE of the cell is T_PCELL. When a cell is the SCell of the UE, a value of the corresponding attribute parameter CELL_TYPE of the cell is T_SCELL. During the PCell change, a value of a cell attribute parameter CELL_TYPE of the source primary cell is changed from T_PCELL to T_SCELL. An active/inactive state of a cell is identified by using an attribute parameter CELL_STATUS of the cell. During the PCell change, a value of an attribute parameter CELL_STATUS of the source primary cell is always ACTIVE. The foregoing only describes the possible implementation by using an example, but does not limit the present invention.

106: The UE sends a message used for indicating PCell change completion to the second base station.

The message used for indicating PCell change completion may be a new message, such as a PCell change completion message; or may be an RRC connection reconfiguration completion message, to indicate that an operation of the PCell change of the UE has been completed.

It may be understood that, a resource used by the UE to send the message used for indicating PCell change completion to the second base station is an uplink resource of the target PCell.

107: After receiving the message that is used for indicating PCell change completion and that is sent by the UE, the second base station sends a message used for indicating PCell change completion or a message used for requesting a sequence number (SN) state to the first base station. The requesting an SN state includes requesting an uplink PDCP SN receiving state and a downlink PDCP SN transmitting state from the first base station.

108: After receiving the message that is used for indicating PCell change completion or the message that is used for requesting an SN state and that is sent by the second base station, the first base station sends an SN state transition message to the second base station, where the message carries an uplink PDCP SN receiving state and a downlink PDCP SN sending state.

In an existing handover technology, after sending a handover command to the UE, the source base station sends an SN state transition message to the target base station to perform SN state transition. However, in the present invention, after receiving the message that is used for indicating PCell change completion and that is sent by the UE, the second base station sends the message used for indicating PCell change completion or the message used for requesting an SN state to the first base station, and the first base station sends an SN state transition message to the second base station only after receiving the message sent by the second base station. It is performed in this way instead of sending, by the first base station, the SN state transition message to the second base station after the first base station sends the message used for indicating a PCell change to the UE, because during the PCell change, the first base station is performing data transmission with the UE. If the first base station performs SN state transition in this case, the first base station cannot allocate a COUNT value or a PDCP sequence number even if subsequently receiving a data packet again from the serving gateway. Consequently, after the first base station completes sending an existing data packet to which a COUNT value is allocated, even if there is a data packet to which no COUNT value is allocated, the data packet cannot be sent by the first base station, because the first base station cannot allocate a COUNT value to the data packet any longer after sending the SN state transition message, and in this case, a connection to the second base station is not established, further causing transmission of this data packet to be interrupted.

Further, for the uplink, the PDCP SN receiving state may include at least one of a count COUNT value of a first unreceived PDCP data packet and a receiving state of a corresponding PDCP receiving window. For the downlink, the PDCP SN sending state may include a start COUNT value (to be specific, from which COUNT value the second base station starts to allocate a sequence number) allocated by the second base station to a downlink data packet to which no sequence number is allocated.

Optionally, after receiving the message used for indicating PCell change completion or the message used for requesting an SN state, the first base station stops allocating a PDCP sequence number to a data packet of the split bearer.

Optionally, the first base station forwards the received uplink data packet to the second base station, and forwards, to the second base station, a downlink data packet to which a sequence number is already allocated and whose successful sending to the UE is not acknowledged and a downlink data packet that is received from the serving gateway and to which no sequence number is allocated.

109: The second base station sends an S1 path switching request message to an MME, to request the MME to switch an S1-MME interface and an S1-U path of a split bearer to the second base station, so that the second base station is changed to a new MeNB, and subsequently the MME sends S1 signaling to the new MeNB and the S-GW sends downlink data of the split bearer to the new MeNB.

110: The MME sends an S1 path switching request acknowledgement message to the second base station, to acknowledge the S1 path switching request message.

In this embodiment of the present invention, a sequence of performing the foregoing steps 107 and 109 is not limited.

After the operations in the foregoing parts, the target PCell of the UE is changed to a current new PCell of the UE, the source PCell of the UE is changed to the SCell that is in the active state and that is of the UE, the second base station is changed to the current new MeNB of the UE, and the first base station is changed to the SeNB of the UE. In addition, in an entire process of the PCell change, data transmission between the UE and a network is uninterrupted.

During the PCell change, data transmission in the first base station and the second base station is uninterrupted, and the UE may be scheduled at any time. Therefore, the UE may send RRC signaling to the first base station in a process in which the first base station sends a message used for indicating a PCell change to the UE but the UE has not processed the message. In this case, after receiving the RRC signaling, the first base station performs processing in two manners: one is forwarding the RRC signaling to the second base station, and the other is discarding the message.

The method in the embodiment shown in FIG. 1 is described by using a dual connectivity (DC) or CA scenario as an example, but this does not limit a scenario to which this embodiment is applicable. The method in this embodiment is also applicable to a single carrier scenario. In the single carrier scenario, UE has only one serving cell. The serving cell may be alternatively understood as a source PCell. A serving cell change is understood as a PCell change. A target serving cell is understood as a target PCell. Correspondingly, by using the method in the embodiment shown in FIG. 1, an inter-base station serving cell change in the single carrier scenario can be implemented. For the single carrier scenario, before a serving cell change, the target serving cell is not the serving cell of the UE. After an inter-base station serving cell change procedure shown in FIG. 1, the UE enters a DC mode from a single carrier mode, the target serving cell is changed to a PCell of the UE, a source serving cell of the UE is changed to an SCell that is in the active state and that is of the UE, the second base station is changed to an MeNB of the UE, and the first base station is changed to an SeNB of the UE. In an entire process of the serving cell change, data transmission between the UE and the network is uninterrupted.

Figure 2:
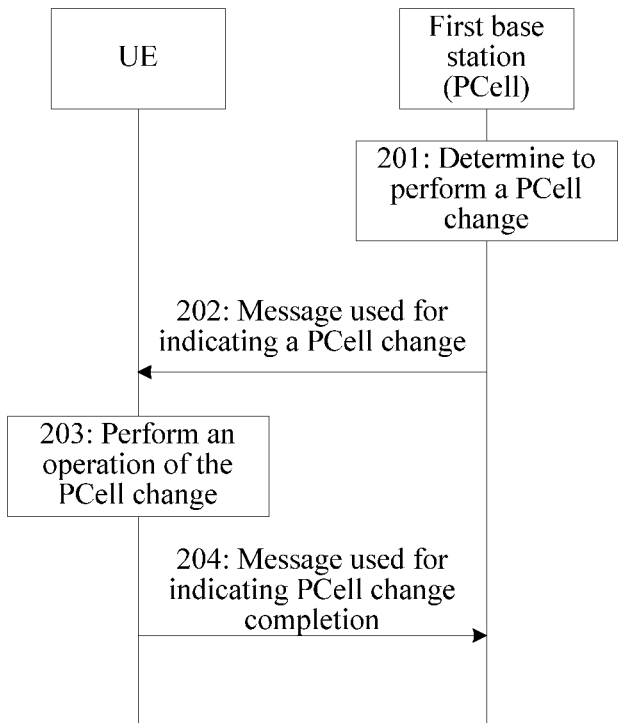
FIG. 2 is a schematic flowchart of a possible intra-base station PCell change according to an embodiment of the present invention.

As shown in FIG. 2, FIG. 2 provides a schematic flowchart of a possible intra-base station PCell change according to an embodiment of the present invention.

201: A first base station determines to perform a PCell change for UE, and determines that a target PCell and a source PCell for the PCell change belong to a same base station. The source PCell is a PCell that provides a service to the UE before the UE performs the PCell change. The first base station is a base station that a source PCell belongs to.

202: The first base station sends a message used for indicating a PCell change to the UE, to request to change a PCell to another serving cell served by the first base station. The message used for indicating a PCell change carries information about the target PCell, for example, a cell identifier or an index of the target PCell.

The message used for indicating a PCell change may be a PCell change message or an RRC connection reconfiguration message that carries a PCell change indication, to indicate that the UE performs the PCell change through modification but not through handover. Specifically, that the PCell change is performed through modification includes: wireless connections between the UE and the source PCell and the target PCell are kept uninterrupted during the PCell change, and the first base station and the second base station can schedule data of the UE during the PCell change. It may be understood that, the message used for indicating a PCell change may alternatively be a message of another type. This is not limited in the present invention.

Optionally, the key and the security algorithm that are used by the first base station may be kept unchanged during and after the PCell change, thereby reducing impact on the data transmission during the PCell change.

203: The UE performs the PCell change based on the message that is used for indicating a PCell change and that is received from the first base station. The PCell change includes: changing the target PCell to the PCell of the UE and changing the source PCell to the secondary cell SCell that is in the active state and that is of the UE.

Optionally, after receiving the message used for indicating a PCell change, the UE determines whether the target PCell is the serving cell of the UE. If the target PCell is the serving cell of the UE, the UE performs a process of the PCell change, and during the PCell change, the UE may continue to perform data transmission with the first base station. Before the PCell change, the target PCell is already the serving cell of the UE, and the UE maintains an available TA value of the target PCell. During the PCell change or after the PCell change, the UE may continue to use a current TA value of the target PCell, and does not need to initiate a random access process in the target PCell, so that the process of the PCell change can be more quickly completed. If the target PCell is not the serving cell of the UE, the UE first adds the target PCell as a secondary cell SCell of the UE, and then performs the process of the PCell change. In a process of adding the target PCell as the SCell of the UE and during the PCell change, the UE may continue to perform data transmission with the first base station. It may be understood that, in a process of adding the target PCell as the SCell of the UE, a TA value of the source PCell may be used as a TA value of the target PCell, without a need to initiate the random access process in the target PCell to obtain the TA value of the target PCell.

It may be understood that, after the PCell change, the source PCell and the target PCell are both serving cells of the UE, and both belong to the first base station. The source PCell and the target PCell serve the UE in a CA manner, and therefore it is equivalent to that at least CA is configured for the UE.

In the current system, when the PCell of the UE is changed, the PCell of the UE is handed over from the source PCell to the target PCell through handover in the prior art, data transmission between the UE and a network side is interrupted in a handover process. However, according to the PCell change method provided in this embodiment of the present invention, the PCell of the UE is changed from the source PCell to the target PCell through modification. Specifically, that the PCell change is performed through modification includes: wireless connections between the UE and the source PCell and the target PCell are kept uninterrupted during the PCell change, and the first base station can schedule data of the UE during the PCell change.

Optionally, the PCell change further includes: skipping resetting a MAC layer of a data bearer of the UE, skipping reconstructing an RLC layer of the data bearer of the UE, and skipping reconstructing a PDCP layer of the data bearer of the UE. Then, continuous data scheduling and transmission during the PCell change can be implemented, transmission interruptions can be reduced or even prevented, and a data packet loss, data packet retransmission, or the like caused by resetting or reconstruction can be prevented, so that service experience for a delay-sensitive service during the PCell change can be effectively improved.

It may be understood that, a signaling bearer is sent by a current PCell, but in this embodiment, the source PCell and the target PCell belong to the same base station, and a security key and a security algorithm of the signaling bearer are kept unchanged; therefore, a MAC layer of the signaling bearer may alternatively not be reset, and an RLC layer and a PDCP layer may alternatively not be reconstructed.

Optionally, the PCell change further includes: keeping a key and a security algorithm that are used by the UE to communicate with each serving base station unchanged during and after the PCell change, where the serving base station is a base station serving at least one cell that establishes a wireless air interface connection to the UE. In this embodiment, the first base station communicates with the UE. However, the UE may further simultaneously communicate with another base station. Optionally, the PCell change further includes: during and/or after the PCell change, keeping an active/inactive state of another serving cell other than the source PCell and the target PCell unchanged. To be specific, if a serving cell is in an active state before the change, the serving cell remains in the active state during the change and/or after the change; if a serving cell is in an inactive state before the change, the serving cell remains in the inactive state during the change and/or after the change. In this way, continuous data transmission between the UE and the another serving cell during the PCell change is implemented.

It may be understood that, the PCell change includes: after the PCell change completion, changing the source PCell to an SCell in the active state, and changing the target PCell to a PCell in the active state.

Optionally, the PCell change further includes: changing a frequency associated with a measurement identifier from a frequency of the source PCell before the PCell change to a frequency of the target PCell after the PCell change.

Optionally, the PCell change further includes: applying a new PUCCH configuration to the target PCell of the UE, where the PUCCH configuration is carried in the message used for indicating a PCell change to the UE.

204: The UE sends a message used for indicating PCell change completion to the first base station.

The message used for indicating PCell change completion may be a new message, such as a PCell change completion message; or may be an RRC connection reconfiguration completion message, to indicate that an operation of the PCell change of the UE has been completed.

It may be understood that, a resource used by the UE to send the message used for indicating PCell change completion to the first base station is an uplink resource of the target PCell.

After the operations in the foregoing parts, the target PCell of the UE is changed to a current new PCell of the UE, and the source PCell of the UE is changed to the SCell that is in the active state and that is of the UE. In an entire process of the PCell change, data transmission between the UE and a network is uninterrupted.

The method in the embodiment shown in FIG. 2 is described by using a carrier aggregation (CA) scenario or a DC scenario as an example, but this does not limit a scenario to which this embodiment is applicable. The method in this embodiment is also applicable to a single carrier scenario. In the single carrier scenario, UE has only one serving cell. The serving cell may be alternatively understood as a source PCell. A serving cell change is understood as a PCell change. A target serving cell is understood as a target PCell. Correspondingly, by using the method in the embodiment shown in FIG. 2, an intra-base station serving cell change in the single carrier scenario can be implemented. For the single carrier scenario, before a serving cell change, the target serving cell is not the serving cell of the UE. After an intra-base station serving cell change procedure shown in FIG. 2, the UE enters a CA mode from a single carrier mode, the target serving cell is changed to a PCell of the UE, and a source serving cell of the UE is changed to an SCell that is in the active state and that is of the UE. In an entire process of the serving cell change, data transmission between the UE and the network is uninterrupted.

For some specific messages and information elements that are provided in the embodiments in FIG. 1 and FIG. 2 and that belong to the prior art, specifically refer to the 3GPP 36.300 V13.1.0 protocol.

The foregoing describes the solutions provided in the embodiments of the present invention mainly from the perspective of interaction between network elements. It may be understood that, to implement the foregoing functions, the network elements such as UE, a base station, and an MME include corresponding hardware structures and/or software modules that perform the functions. A person skilled in the art should be very easily aware that, the units and solution steps described in combination with each example in the embodiments disclosed in this specification can be implemented in a form of computer software, hardware, or a combination of hardware and computer software. Whether a function is performed in a mode of hardware, computer software, or hardware driven by computer software depends on particular applications and design constraint conditions of the technical solutions. A person skilled in the art can use different methods to implement the described functions for each specific application, but it should not be considered that the implementation goes beyond the scope of the present invention.

Figure 3:
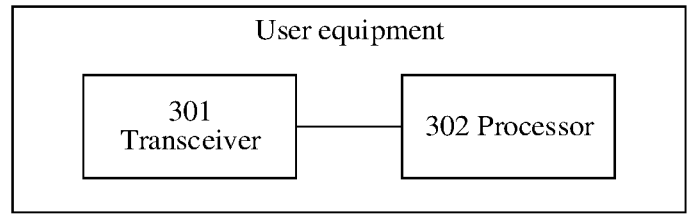
FIG. 3 is a schematic diagram of a possible apparatus structure of UE according to an embodiment of the present invention.

FIG. 3 is a schematic diagram of a possible apparatus structure of UE according to an embodiment of the present invention. The UE implements the functions of the UE in the embodiment in FIG. 1 and/or FIG. 2, and therefore can also achieve the beneficial effects that can be achieved by the method provided in the embodiment in FIG. 1 and/or FIG. 2. The UE specifically includes a transceiver 301 and a processor 302.

The transceiver 301 is configured to receive, from a first base station, a message used for indicating a PCell change. The first base station is a base station that a source PCell of the UE belongs to, and the message used for indicating a PCell change carries information about a target PCell.

The processor 302 is configured to perform a PCell change based on the received message used for indicating a PCell change. The PCell change includes: changing the target PCell to the PCell of the UE and changing the source PCell to the SCell that is in the active state and that is of the UE.

The transceiver 301 is further configured to send a message used for indicating PCell change completion to the first base station or a second base station, where the second base station is a base station that the target PCell belongs to.

Further, the message that is used for indicating a PCell change and that is received by the transceiver 301 may be a PCell change message or an RRC connection reconfiguration message that carries a PCell change indication, to indicate that the UE performs the PCell change through modification but not through handover.

Further, the message that is used for indicating PCell change completion and that is sent by the transceiver 301 may be a new message, such as a PCell change completion message; or may be an RRC connection reconfiguration completion message, to indicate that an operation of the PCell change of the UE has been completed.

Optionally, after receiving the message used for indicating a PCell change, the processor 302 determines whether the target PCell is a serving cell of the UE. If the target PCell is the serving cell of the UE, the processor 302 performs a process of the PCell change. During the PCell change, the transceiver 301 may continue to perform data transmission with the first base station or with the first base station and the second base station. If the target PCell is not the serving cell of the UE, the processor 302 first adds the target PCell as a secondary cell SCell of the UE, and then performs the process of the PCell change. In a process of adding the target PCell as the SCell of the UE and during the PCell change, the transceiver 301 may continue to perform data transmission with the first base station or with the first base station and the second base station.

Optionally, the processor 302 is further configured to: skip resetting a MAC layer of a data bearer of the UE, skip reconstructing an RLC layer of the data bearer of the UE, and skip reconstructing a PDCP layer of the data bearer of the UE. Then, continuous data scheduling and transmission during the PCell change can be implemented, transmission interruptions can be reduced or even prevented, and a data packet loss, data packet retransmission, or the like caused by resetting or reconstruction can be prevented, so that service experience for a delay-sensitive service during the PCell change can be effectively improved.

Optionally, the processor 302 is further configured to: keep a key and a security algorithm that are used to communicate with each serving base station unchanged during and after the PCell change, where the serving base station is a base station serving at least one cell that establishes a wireless air interface connection to the UE, and the serving base station includes at least the first base station.

Optionally, the processor 302 is further configured to determine whether the source PCell and the target PCell belong to a same base station. When the source PCell and the target PCell do not belong to the same base station, the processor 302 uses the first base station as a secondary eNodeB (SeNB), and uses the second base station as a master eNodeB (MeNB). A corresponding primary cell group (MCG) bearer and secondary cell group (SCG) bearer may alternatively be correspondingly changed, to change a bearer type associated with the first base station from the MCG bearer to the SCG bearer, and change a bearer type associated with the second base station from the SCG bearer to the MCG bearer.

Optionally, the processor 302 is further configured to: determine whether the source PCell and the target PCell belong to a same base station; and when the source PCell and the target PCell belong to a same base station, skip resetting a MAC layer of a data bearer of the UE, skip reconstructing an RLC layer of the data bearer of the UE, and skip reconstructing a PDCP layer of the data bearer of the UE.

Optionally, the transceiver 301 is further configured to: during and/or after the PCell change, communicate with the target PCell by continuing to use a timing advance TA value of the target PCell before the PCell change, without a need to obtain the TA value again by using a random access process.

Optionally, the processor 302 is further configured to: during and/or after the PCell change, keep an active/inactive state of another serving cell other than the source PCell and the target PCell unchanged.

Further, the UE in this embodiment of the present invention implements the steps/behaviors in the method performed by the UE in the method embodiment in FIG. 1 and/or FIG. 2. Functions of parts of the UE may be specifically implemented according to the method in the foregoing method embodiments. For a specific implementation process of the functions, refer to related descriptions in the foregoing method embodiments.

It may be understood that, FIG. 3 shows only one design of the UE. In actual application, the UE may include any quantity of transceivers and processors, and all UEs that can implement the present invention fall within the protection scope of the present invention.

Figure 4:
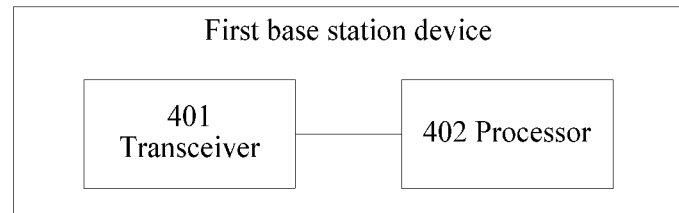
FIG. 4 is a schematic diagram of a possible apparatus structure of a first base station according to an embodiment of the present invention.

FIG. 4 is a schematic diagram of a possible apparatus structure of a first base station according to an embodiment of the present invention. The first base station implements the functions of the first base station in the embodiment in FIG. 1 and/or FIG. 2, and therefore can also achieve the beneficial effects that can be achieved by the method provided in the embodiment in FIG. 1 and/or FIG. 2. The first base station is a base station that a source PCell of the UE belongs to. The first base station specifically includes a transceiver 401 and a processor 402.

The processor 402 is configured to: determine to perform a primary cell PCell change, and determine a target PCell.

The transceiver 401 is configured to send a message used for indicating a PCell change to the UE, where the message used for indicating a PCell change carries information about a target PCell, and the PCell change includes: changing the target PCell to a PCell of the UE and changing the source PCell to a secondary cell SCell that is in an active state and that is of the UE.

The message that is used for indicating a PCell change and that is sent by the transceiver 401 may be a PCell change message or an RRC connection reconfiguration message that carries a PCell change indication.

The processor 402 is further configured to: decrypt uplink data from the UE, and encrypt downlink data sent to the UE. Optionally, a key and a security algorithm that are used by the processor 402 are kept unchanged during and after the PCell change.

Optionally, in an intra-base station PCell change scenario, the transceiver 401 is further configured to receive, from the UE, a message used for indicating PCell change completion. The message used for indicating PCell change completion may be a new message, such as a PCell change completion message; or may be an RRC connection reconfiguration completion message, to indicate that an operation of the PCell change of the UE has been completed.

Optionally, in an inter-base station PCell change scenario, the transceiver 401 is further configured to send a request message used for indicating a PCell change to a second base station, where the second base station is a base station that the target PCell belongs to. The request message used for indicating a PCell change carries information about the target PCell, for example, a cell identifier or an index of the target PCell. The request message used for indicating a PCell change may be a PCell change request message or a handover request message that carries a PCell change indication, and indicates that the PCell change is performed through modification.

Optionally, in the inter-base station PCell change scenario, the transceiver 401 is further configured to receive an acknowledgement message sent by the second base station, where the acknowledgement message is used for acknowledging the request message that is used for indicating a PCell change and that is sent by the first base station to the second base station.

Optionally, in the inter-base station PCell change scenario, the transceiver 401 is further configured to receive a message that is used for indicating PCell change completion or a message that is used for requesting an SN state and that is sent by the second base station, where the message used for requesting an SN state is used for requesting an uplink packet data convergence protocol PDCP SN receiving state and a downlink PDCP SN sending state from the first base station.

Optionally, in the inter-base station PCell change scenario, the transceiver 401 is further configured to send an SN state transition message to the second base station, where the SN state transition message carries the uplink PDCP SN receiving state and the downlink PDCP SN sending state, and the SN state transition message is sent by the transceiver 401 after the transceiver 401 receives the message used for indicating PCell change completion or the message used for requesting an SN state.

Further, the first base station in this embodiment of the present invention implements the steps/behaviors in the method performed by the first base station in the method embodiment in FIG. 1 and/or FIG. 2. Functions of parts of the first base station may be specifically implemented according to the method in the foregoing method embodiments. For a specific implementation process of the functions, refer to related descriptions in the foregoing method embodiments.

It may be understood that, FIG. 4 shows only one design of the first base station. In actual application, the first base station may include any quantity of transceivers and processors, and all first base stations that can implement the present invention fall within the protection scope of the present invention.

Figure 5:
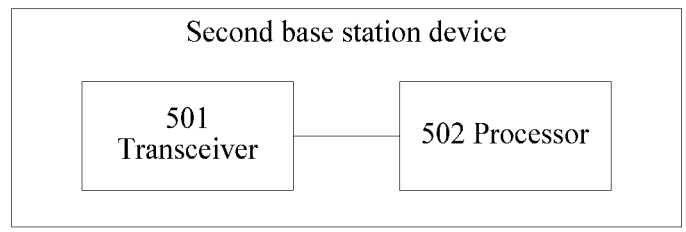
FIG. 5 is a schematic diagram of a possible apparatus structure of a second base station according to an embodiment of the present invention.

FIG. 5 is a schematic diagram of a possible apparatus structure of a second base station according to an embodiment of the present invention. The second base station implements the functions of the second base station in the embodiment in FIG. 1, and therefore can also achieve the beneficial effects that can be achieved by the method provided in the embodiment in FIG. 1. The second base station is a base station that a target PCell of UE belongs to.

The second base station specifically includes a transceiver 501. The transceiver 501 is configured to receive a request message that is used for indicating a primary cell PCell change and that is sent by a first base station, where the first base station is a base station that a source PCell of UE belongs to, the request message used for indicating a PCell change carries information about the target PCell, and the PCell change includes: changing the target PCell to a PCell of the UE and changing the source PCell to a secondary cell SCell that is in an active state and that is of the UE.

The transceiver 501 is further configured to send an acknowledgement message to the first base station, to acknowledge the request message that is used for indicating a PCell change and that is sent by the first base station to the second base station.

Further, the request message that is used for indicating a PCell change and that is received by the transceiver 501 may be a PCell change request message or a handover request message that carries a PCell change indication, and indicates that the PCell change is performed through modification.

Optionally, the acknowledgement message sent by the transceiver 501 to the first base station may carry second GTP tunnel information of the split bearer, to transmit an uplink data packet that is decrypted and sent by the first base station to the second base station after S1 path switching. The uplink data packet is forwarded by the transceiver 501 to a serving gateway (S-GW).

Optionally, the transceiver 501 is further configured to receive a message that is used for indicating PCell change completion and that is sent by the UE. The message used for indicating PCell change completion may be a new message, such as a PCell change completion message; or may be an RRC connection reconfiguration completion message, to indicate that an operation of the PCell change of the UE has been completed.

Optionally, the transceiver 501 is further configured to send the message used for indicating PCell change completion or a message used for requesting an SN state to the first base station. The requesting an SN state includes requesting an uplink PDCP SN receiving state and a downlink PDCP SN transmitting state from the first base station. The message used for indicating PCell change completion or the message used for requesting an SN state is sent by the transceiver 501 after the transceiver 501 receives the message used for indicating PCell change completion from the UE.

Optionally, the transceiver 501 is further configured to receive an SN state transition message from the first base station, where the message carries the uplink PDCP SN receiving state and the downlink PDCP SN sending state.

It may be understood that, the second base station further includes a processor 502, and the processor 502 is configured to: decrypt uplink data from the UE, encrypt downlink data sent to the UE, and keep a key and a security algorithm that are used by the processor 502 unchanged during and after the PCell change.

Further, the first base station in this embodiment of the present invention implements the steps/behaviors in the method performed by the second base station in the method embodiment in FIG. 1. Functions of parts of the first base station may be specifically implemented according to the method in the foregoing method embodiments. For a specific implementation process of the functions, refer to related descriptions in the foregoing method embodiments.

It may be understood that, FIG. 5 shows only one design of the second base station. In actual application, the second base station may include any quantity of transceivers and processors, and all second base stations that can implement the present invention fall within the protection scope of the present invention.

Figure 6:
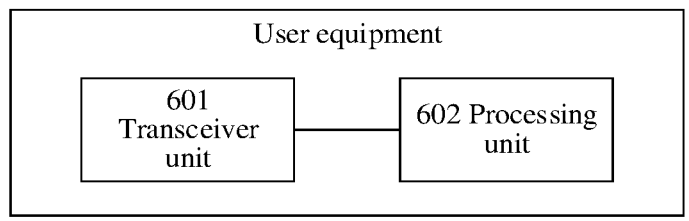
FIG. 6 is a schematic diagram of another possible apparatus structure of UE according to an embodiment of the present invention.

FIG. 6 is a schematic diagram of another possible apparatus structure of UE according to an embodiment of the present invention. The UE implements the functions of the UE in the embodiment in FIG. 1 and/or FIG. 2, and therefore can also achieve the beneficial effects that can be achieved by the method provided in the embodiment in FIG. 1 and/or FIG. 2. The UE specifically includes a transceiver unit 601 and a processing unit 602.

The transceiver unit 6/0 is configured to receive, from a first base station, a message used for indicating a PCell change. The first base station is a base station that a source PCell of the UE belongs to, and the message used for indicating a PCell change carries information about a target PCell.

The processing unit 602 is configured to perform a PCell change based on the received message used for indicating a PCell change. The PCell change includes: changing the target PCell to a PCell of the UE and changing the source PCell to an SCell that is in an active state and that is of the UE.

The transceiver unit 601 is further configured to send a message used for indicating PCell change completion to the first base station or a second base station, where the second base station is a base station that the target PCell belongs to.

Further, the message that is used for indicating a PCell change and that is received by the transceiver unit 601 may be a PCell change message or an RRC connection reconfiguration message that carries a PCell change indication, to indicate that the UE performs the PCell change through modification but not through handover.

Further, the message that is used for indicating PCell change completion and that is sent by the transceiver unit 601 may be a new message, such as a PCell change completion message; or may be an RRC connection reconfiguration completion message, to indicate that an operation of the PCell change of the UE has been completed.

Optionally, after receiving the message used for indicating a PCell change, the processing unit 602 determines whether the target PCell is a serving cell of the UE. If the target PCell is the serving cell of the UE, the processing unit 602 performs a process of the PCell change. During the PCell change, the transceiver unit 601 may continue to perform data transmission with the first base station or with the first base station and the second base station. If the target PCell is not the serving cell of the UE, the processing unit 602 first adds the target PCell as a secondary cell SCell of the UE, and then performs the process of the PCell change. In a process of adding the target PCell as the SCell of the UE and during the PCell change, the transceiver unit 601 may continue to perform data transmission with the first base station or with the first base station and the second base station.

Optionally, the processing unit 602 is further configured to: skip resetting a MAC layer of a data bearer of the UE, skip reconstructing an RLC layer of the data bearer of the UE, and skip reconstructing a PDCP layer of the data bearer of the UE. Then, continuous data scheduling and transmission during the PCell change can be implemented, transmission interruptions can be reduced or even prevented, and a data packet loss, data packet retransmission, or the like caused by resetting or reconstruction can be prevented, so that service experience for a delay-sensitive service during the PCell change can be effectively improved.

Optionally, the processing unit 602 is further configured to: keep a key and a security algorithm that are used to communicate with each serving base station unchanged during and after the PCell change, where the serving base station is a base station serving at least one cell that establishes a wireless air interface connection to the UE, and the serving base station includes at least the first base station.

Optionally, the processing unit 602 is further configured to determine whether the source PCell and the target PCell belong to a same base station. When the source PCell and the target PCell do not belong to the same base station, the processing unit 602 uses the first base station as a secondary eNodeB (SeNB), and uses the second base station as a master eNodeB (MeNB). A corresponding primary cell group (MCG) bearer and secondary cell group (SCG) bearer may alternatively be correspondingly changed, to change a bearer type associated with the first base station from the MCG bearer to the SCG bearer, and change a bearer type associated with the second base station from the SCG bearer to the MCG bearer.

Optionally, the processing unit 602 is further configured to: determine whether the source PCell and the target PCell belong to a same base station; and when the source PCell and the target PCell belong to a same base station, skip resetting a MAC layer of a data bearer of the UE, skip reconstructing an RLC layer of the data bearer of the UE, and skip reconstructing a PDCP layer of the data bearer of the UE.

Optionally, the transceiver unit 601 is further configured to: during and/or after the PCell change, communicate with the target PCell by continuing to use a timing advance TA value of the target PCell before the PCell change, without a need to obtain the TA value again by using a random access process.

Optionally, the processing unit 602 is further configured to: during and/or after the PCell change, keep an active/inactive state of another serving cell other than the source PCell and the target PCell unchanged.

Further, the UE in this embodiment of the present invention implements the steps/behaviors in the method performed by the UE in the method embodiment in FIG. 1 and/or FIG. 2. Functions of parts of the UE may be specifically implemented according to the method in the foregoing method embodiments. For a specific implementation process of the functions, refer to related descriptions in the foregoing method embodiments.

Figure 7:
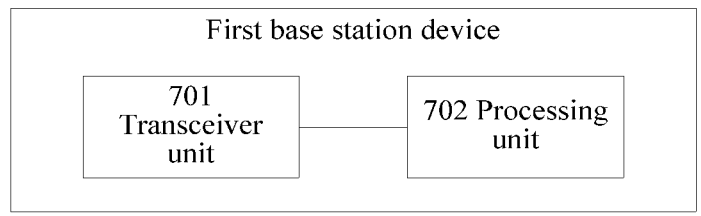
FIG. 7 is a schematic diagram of another possible apparatus structure of a first base station according to an embodiment of the present invention.

FIG. 7 is a schematic diagram of another possible apparatus structure of a first base station according to an embodiment of the present invention. The first base station implements the functions of the first base station in the embodiment in FIG. 1 and/or FIG. 2, and therefore can also achieve the beneficial effects that can be achieved by the method provided in the embodiment in FIG. 1 and/or FIG. 2. The first base station is a base station that a source PCell of the UE belongs to. The first base station specifically includes a transceiver unit 701 and a processing unit 702.

The processing unit 702 is configured to: determine to perform a PCell change, and determine a target PCell.

The transceiver unit 701 is configured to send a message used for indicating a PCell change to the UE, where the message used for indicating a PCell change carries information about the target PCell, and the PCell change includes: changing the target PCell to a PCell of the UE and changing the source PCell to a secondary cell SCell that is in an active state and that is of the UE.

The message that is used for indicating a PCell change and that is sent by the transceiver unit 701 may be a PCell change message or an RRC connection reconfiguration message that carries a PCell change indication.

The processing unit 702 is further configured to: decrypt uplink data from the UE, and encrypt downlink data sent to the UE. Optionally, a key and a security algorithm that are used by the processing unit 702 are kept unchanged during and after the PCell change.

Optionally, in an intra-base station PCell change scenario, the transceiver unit 701 is further configured to receive, from the UE, a message used for indicating PCell change completion. The message used for indicating PCell change completion may be a new message, such as a PCell change completion message; or may be an RRC connection reconfiguration completion message, to indicate that an operation of the PCell change of the UE has been completed.

Optionally, in an inter-base station PCell change scenario, the transceiver unit 701 is further configured to send a request message used for indicating a PCell change to a second base station, where the second base station is a base station that the target PCell belongs to. The request message used for indicating a PCell change carries information about the target PCell, for example, a cell identifier or an index of the target PCell. The request message used for indicating a PCell change may be a PCell change request message or a handover request message that carries a PCell change indication, and indicates that the PCell change is performed through modification.

Optionally, in the inter-base station PCell change scenario, the transceiver unit 701 is further configured to receive an acknowledgement message sent by the second base station, where the acknowledgement message is used for acknowledging the request message that is used for indicating a PCell change and that is sent by the first base station to the second base station.

Optionally, in the inter-base station PCell change scenario, the transceiver unit 701 is further configured to receive a message that is used for indicating PCell change completion or a message that is used for requesting an SN state and that is sent by the second base station, where the message used for requesting an SN state is used for requesting an uplink packet data convergence protocol PDCP SN receiving state and a downlink PDCP SN sending state from the first base station.

Optionally, in the inter-base station PCell change scenario, the transceiver unit 701 is further configured to send an SN state transition message to the second base station, where the SN state transition message carries the uplink PDCP SN receiving state and the downlink PDCP SN sending state, and the SN state transition message is sent by the transceiver unit 701 after the transceiver unit 701 receives the message used for indicating PCell change completion or the message used for requesting an SN state.

Further, the first base station in this embodiment of the present invention implements the steps/behaviors in the method performed by the first base station in the method embodiment in FIG. 1 and/or FIG. 2. Functions of parts of the first base station may be specifically implemented according to the method in the foregoing method embodiments. For a specific implementation process of the functions, refer to related descriptions in the foregoing method embodiments.

Figure 8:
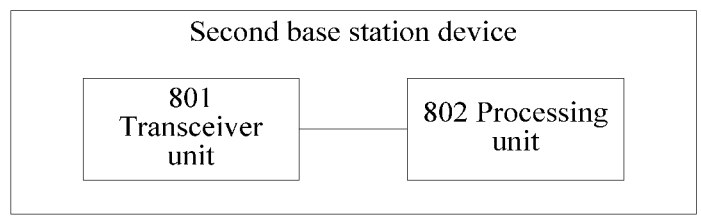
FIG. 8 is a schematic diagram of another possible apparatus structure of a second base station according to an embodiment of the present invention.

FIG. 8 is a schematic diagram of another possible apparatus structure of a second base station according to an embodiment of the present invention. The second base station implements the functions of the second base station in the embodiment in FIG. 1, and therefore can also achieve the beneficial effects that can be achieved by the method provided in the embodiment in FIG. 1. The second base station is a base station that a target PCell of UE belongs to.

The second base station specifically includes a transceiver unit 801. The transceiver unit 801 is configured to receive a request message that is used for indicating a primary cell PCell change and that is sent by a first base station, where the first base station is a base station that a source PCell of the UE belongs to, the request message used for indicating a PCell change carries information about the target PCell, and the PCell change includes: changing the target PCell to a PCell of the UE and changing the source PCell to a secondary cell SCell that is in an active state and that is of the UE.

The transceiver unit 801 is further configured to send an acknowledgement message to the first base station, to acknowledge the request message that is used for indicating a PCell change and that is sent by the first base station to the second base station.

Further, the request message that is used for indicating a PCell change and that is received by the transceiver unit 801 may be a PCell change request message or a handover request message that carries a PCell change indication, and indicates that the PCell change is performed through modification.

Optionally, the acknowledgement message sent by the transceiver unit 801 to the first base station may carry second GTP tunnel information of the split bearer, to transmit an uplink data packet that is decrypted and sent by the first base station to the second base station after S1 path switching. The uplink data packet is forwarded by the transceiver unit 801 to an S-GW.

Optionally, the transceiver unit 801 is further configured to receive a message that is used for indicating PCell change completion and that is sent by the UE. The message used for indicating PCell change completion may be a new message, such as a PCell change completion message; or may be an RRC connection reconfiguration completion message, to indicate that an operation of the PCell change of the UE has been completed.

Optionally, the transceiver unit 801 is further configured to send the message used for indicating PCell change completion or a message used for requesting an SN state to the first base station. The requesting an SN state includes requesting an uplink PDCP SN receiving state and a downlink PDCP SN transmitting state from the first base station. The message used for indicating PCell change completion or the message used for requesting an SN state is sent by the transceiver unit 801 after the transceiver unit 801 receives the message used for indicating PCell change completion from the UE.

Optionally, the transceiver unit 801 is further configured to receive an SN state transition message from the first base station, where the message carries the uplink PDCP SN receiving state and the downlink PDCP SN sending state.

It may be understood that, the second base station further includes a processing unit 802, and the processing unit 802 is configured to: decrypt uplink data from the UE, encrypt downlink data sent to the UE, and keep a key and a security algorithm that are used by the processing unit 802 unchanged during and after the PCell change.

Further, the first base station in this embodiment of the present invention implements the steps/behaviors in the method performed by the second base station in the method embodiment in FIG. 1. Functions of parts of the first base station may be specifically implemented according to the method in the foregoing method embodiments. For a specific implementation process of the functions, refer to related descriptions in the foregoing method embodiments.

An embodiment of the present invention further provides a communications system. The system includes: the UE provided in the embodiment shown in FIG. 3 or FIG. 6, the first base station provided in the embodiment shown in FIG. 4 or FIG. 7, and the second base station provided in the embodiment shown in FIG. 5 or FIG. 8; or the UE provided in the embodiment shown in FIG. 3 or FIG. 6 and the first base station provided in the embodiment shown in FIG. 4 or FIG. 7; or the first base station provided in the embodiment shown in FIG. 4 or FIG. 7 and the second base station provided in the embodiment shown in FIG. 5 or FIG. 8.

To execute the UE in this embodiment of the present invention, a processor for functions of the first base station and the second base station may be a central processing unit (CPU), a general purpose processor, a digital signal processor (DSP), an application-specific integrated circuit (ASIC), a field programmable gate array (FPGA) or another programmable logic device, a transistor logic device, a hardware part, or any combination thereof. It can implement or perform examples of various logical functions and modules described with reference to the disclosed content of the present invention.

A person skilled in the art should be aware that in one or more of the foregoing examples, the functions described in the present invention may be implemented by using hardware, software, firmware, or any combination thereof. When the functions are implemented by software, these functions may be stored in a computer-readable medium or transmitted as one or more instructions or code in the computer-readable medium. The computer-readable medium includes a computer storage medium and a communications medium, where the communications medium includes any medium that enables a computer program or related information to be transmitted from one place to another. The storage medium may be any available medium accessible to a general purpose or dedicated computer.

The objectives, technical solutions, and beneficial effects of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made on the basis of the technical solutions of the present invention shall fall within the protection scope of the present invention.

What is claimed is:

1. A method comprising:
    receiving, by user equipment (UE) from a first base station, a first message indicating a primary cell (PCell) change, wherein when the first message is received a PCell of the UE is a source PCell, the source PCell belonging to the first base station and the first message carrying information about a target PCell;
    performing, by the UE, the PCell change based on the first message, wherein performing the PCell change comprises:
        changing the PCell of the UE to be the target PCell, and changing the source PCell to be a secondary cell (SCell) of the UE, wherein, during the PCell change, the UE continues to perform bearer data transmission with the source PCell and the target PCell; and
        during the PCell change or after the PCell change, communicating, by the UE, with the target PCell by continuing to use a timing advance (TA) value of the target PCell before the PCell change; and
    sending, by the UE, a second message indicating a PCell change completion to the first base station or a second base station, wherein the target PCell belongs to the second base station.

2. The method according to claim 1, wherein performing the PCell change further comprises:
    determining, by the UE, that the target PCell is not a serving cell of the UE;
    adding, by the UE, the target PCell as the SCell of the UE; and
    performing, by the UE, the PCell change by changing the target PCell to be the PCell of the UE and changing the source PCell to be the SCell of the UE that is in an active state.

3. The method according to claim 1, wherein performing the PCell change further comprises:
    skipping resetting a medium access control (MAC) layer of a data bearer of the UE;
    skipping reconstructing a radio link control (RLC) layer of the data bearer of the UE; and
    skipping reconstructing a packet data convergence protocol (PDCP) layer of the data bearer of the UE.

4. The method according to claim 1, wherein performing the PCell change further comprises keeping a key and a security algorithm that are used by the UE to communicate with each serving base station of the UE unchanged during the PCell change and after the PCell change, and wherein each serving base station of the UE respectively serves at least one cell that establishes a wireless air interface connection to the UE.

5. The method according to claim 1, wherein performing the PCell change further comprises:
    determining, by the UE, that the source PCell and the target PCell do not belong to a same base station; and
    using, by the UE, the first base station as a secondary eNodeB (SeNB), and using the second base station as a master eNodeB (MeNB).

6. The method according to claim 1, wherein performing the PCell change further comprises:
    determining, by the UE, that the source PCell and the target PCell belong to a same base station; and
    skipping resetting a medium access control (MAC) layer of a signaling bearer of the UE, skipping reconstructing a radio link control (RLC) layer of the signaling bearer of the UE, and skipping reconstructing a packet data convergence protocol (PDCP) layer of the signaling bearer of the UE.

7. The method according to claim 1, wherein the first message is a PCell change message, or the first message is a radio resource control (RRC) connection reconfiguration message that carries a PCell change indication.

8. The method according to claim 1, wherein the second message is a PCell change completion message, or the second message is an RRC connection reconfiguration completion message.

9. A user equipment (UE) comprising:
    a transceiver configured to receive a first message indicating a primary cell (PCell) change from a first base station, wherein, when the first message is received, a PCell of the UE is a source PCell, the source PCell belonging to the first base station and the first message carrying information about a target PCell; and
    a processor configured to:
        determine that the target PCell is not a serving cell of the UE;
        add the target PCell as a secondary cell (SCell) of the UE; and
        perform the PCell change based on the first message, wherein performing the PCell change comprises changing the PCell of the UE to be the target PCell, and changing the source PCell to be the SCell of the UE that is in an active state,
    wherein the transceiver is further configured to send a second message indicating a PCell change completion to the first base station or a second base station,
    wherein the target PCell belongs to the second base station, and
    wherein the UE is configured to continue to perform bearer data transmission with the source PCell and the target PCell.

10. The UE according to claim 9, wherein the processor is further configured to:

skip resetting a medium access control (MAC) layer of a data bearer of the UE;

skip reconstructing a radio link control (RLC) layer of the data bearer of the UE; and skip reconstructing a packet data convergence protocol (PDCP) layer of the data bearer of the UE.

11. The UE according to claim 9, wherein the processor is further configured to keep a key and a security algorithm that are used to communicate with each serving base station of the UE unchanged during the PCell change and after the PCell change, and wherein each serving base station of the UE respectively serves at least one cell that establishes a wireless air interface connection to the UE.

12. The UE according to claim 9, wherein the processor is further configured to:

determine that the source PCell and the target PCell do not belong to a same base station; and use the first base station as a secondary eNodeB (SeNB), and use the second base station as a master eNodeB (MeNB).

13. The UE according to claim 9, wherein the processor is further configured to:

determine that the source PCell and the target PCell belong to a same base station; and skip resetting a medium access control (MAC) layer of a signaling bearer of the UE, skip reconstructing a radio link control (RLC) layer of the signaling bearer of the UE, and skip reconstructing a packet data convergence protocol (PDCP) layer of the signaling bearer of the UE.

14. The UE according to claim 9, wherein the transceiver is further configured to during the PCell change, or after the PCell change, communicate with the target PCell by continuing to use a timing advance (TA) value of the target PCell before the PCell change.

15. The UE according to claim 9, wherein the processor is further configured to, during the PCell change, or after the PCell change, keep an active or inactive state of a serving cell unchanged, and wherein the serving cell is different than the source PCell and the target PCell.

16. The UE according to claim 9, wherein the first message is a PCell change message, or the first message is a radio resource control (RRC) connection reconfiguration message that carries a PCell change indication.

17. A method comprising:

receiving, by user equipment (UE) from a first base station, a first message indicating a primary cell (PCell) change, wherein, when the first message is received, a PCell of the UE is a source PCell, the source PCell belonging to the first base station and the first message carrying information about a target PCell;

performing, by the UE, the PCell change based on the first message, wherein performing the PCell change comprises:

determining, by the UE, that the target PCell is not a serving cell of the UE;

adding, by the UE, the target PCell as a secondary cell (SCell) of the UE; and performing, by the UE, the PCell change based on the first message by changing the target PCell to be the PCell of the UE and changing the source PCell to be the SCell of the UE that is in an active state, the UE continues to perform bearer data transmission with the source PCell and the target PCell; and sending, by the UE, a second message indicating a PCell change completion to the first base station or a second base station, wherein the target PCell belongs to the second base station.

18. The method according to claim 17, wherein performing the PCell change further comprises during the PCell change, or after the PCell change, keeping an active or inactive state of a serving cell unchanged, and wherein the serving cell is different than the source PCell and the target PCell.

19. The method according to claim 17, wherein the first message is a PCell change message, or the first message is a radio resource control (RRC) connection reconfiguration message that carries a PCell change indication, and wherein the second message is a PCell change completion message, or the second message is an RRC connection reconfiguration completion message.

20. The method according to claim 17, wherein performing the PCell change further comprises:

skipping resetting a medium access control (MAC) layer of a data bearer of the UE;

skipping reconstructing a radio link control (RLC) layer of the data bearer of the UE; and skipping reconstructing a packet data convergence protocol (PDCP) layer of the data bearer of the UE.

* * * * *